United States Patent
Lin et al.

(10) Patent No.: US 9,656,394 B2
(45) Date of Patent: May 23, 2017

(54) ROBOTIC SYSTEM WITH RECONFIGURABLE END-EFFECTOR ASSEMBLY

(71) Applicant: GM GLOBAL TECHNOLOGY OPERATIONS LLC, Detroit, MI (US)

(72) Inventors: Yhu-Tin Lin, Rochester Hills, MI (US); Dooil Hwang, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/134,602

(22) Filed: Apr. 21, 2016

(65) Prior Publication Data

US 2016/0339590 A1 Nov. 24, 2016

Related U.S. Application Data

(60) Provisional application No. 62/164,971, filed on May 21, 2015.

(51) Int. Cl.
*B25J 15/04* (2006.01)
*B25J 15/00* (2006.01)
*B25J 15/06* (2006.01)

(52) U.S. Cl.
CPC ....... *B25J 15/0061* (2013.01); *B25J 15/0408* (2013.01); *B25J 15/0616* (2013.01); *Y10S 901/30* (2013.01); *Y10S 901/41* (2013.01)

(58) Field of Classification Search
CPC  B25J 15/0052; B25J 15/0061; B25J 15/0066; B25J 15/0057; B25J 15/04; B25J 15/0408; B25J 15/0433; B25J 15/045; B25J 15/0458; B25J 15/0253; B25J 15/0616; B25J 9/08; Y10S 483/901; Y10S 901/30; Y10S 901/41
USPC .............................. 294/86.4, 119.1; 483/901
See application file for complete search history.

(56) References Cited

U.S. PATENT DOCUMENTS

| | | | | |
|---|---|---|---|---|
| 4,741,078 | A * | 5/1988 | Kimura ................. | B23B 39/205 29/39 |
| 5,131,706 | A * | 7/1992 | Appleberry .......... | B23Q 3/1554 294/119.1 |
| 5,174,694 | A * | 12/1992 | Voellmer .............. | B23B 31/103 279/79 |
| 5,974,643 | A * | 11/1999 | Hays ................... | B23Q 17/2233 29/39 |
| 7,421,886 | B1 * | 9/2008 | Fox ........................ | G01M 3/28 403/31 |
| 8,108,978 | B2 * | 2/2012 | Van Zile, III ...... | B23K 37/0443 269/45 |
| 8,857,877 | B2 | 10/2014 | Lin et al. | |

(Continued)

*Primary Examiner* — Dean Kramer
(74) *Attorney, Agent, or Firm* — Quinn IP Law

(57) ABSTRACT

A robotic system includes a robotic arm and an end-effector assembly movably coupled to the robotic arm. The end-effector assembly includes a main boom, a frame rail coupled to the main boom, and a plurality of tool branches movably coupled to the frame rail. Each tool branch includes a branch rail movably coupled to the frame rail, a lock coupling the branch rail to the frame rail, and a protrusion coupled to the first lock. The robotic system also includes a configuration tool movably coupled to the robotic arm. The configuration tool includes including a tool body, a gripper coupled to the tool body, and a driver bit extending from the tool body.

18 Claims, 6 Drawing Sheets

(56) References Cited

U.S. PATENT DOCUMENTS

| | | | |
|---|---|---|---|
| 2006/0291951 A1* | 12/2006 | Van Zile | B25J 15/0052 403/97 |
| 2009/0035107 A1* | 2/2009 | Duran | B25J 5/02 414/426 |
| 2009/0194922 A1* | 8/2009 | Lin | B25J 15/0052 269/55 |
| 2014/0125080 A1* | 5/2014 | Dan | B25J 15/0019 294/213 |

* cited by examiner

ROBOTIC SYSTEM WITH RECONFIGURABLE END-EFFECTOR ASSEMBLY

CROSS-REFERENCE TO RELATED APPLICATION

The present disclosure claims priority to, and the benefit of, U.S. Provisional Patent Application No. 62/164,971, filed on May 21, 2015, the entire disclosure of which is herein incorporated by reference.

TECHNICAL FIELD

The present disclosure relates to a robotic system with a reconfigurable end-effector assembly.

BACKGROUND

Multi-axis industrial robots include articulated arms connected via a shoulder joint. Each segment is driven via one or more joint motors. Typical industrial robots are controlled with respect to six different control axes. Collectively, the control axes enable rotation of the robot with respect to a fixed or mobile base, extension/retraction of a first arm, and raising/lowering of a second arm, as well as shoulder joint rotation and rotation/translation of a wrist disposed at a distal end of the second arm. Additional arms may be used in a serial arrangement depending on the design, and an end-effector connected to the wrist may be manipulated to perform a desired work task.

The term "end-effector" refers to the particular end linkages or segments that, depending on the design of the robot, can securely grip, transport, orient, and release a work piece. Certain end-effector assemblies are formed via a latticed array of elongated beams and rails to which are attached a set of tool branches suspended with tool modules, e.g., suction cups or grippers of the type used for moving metal panels or panes of glass in a manufacturing facility. The individual tool branches and tool modules can be manually adjusted by an operator to a predetermined configuration prior to performing a specified work task.

SUMMARY

A robotic system includes a multi-axis robot, an end-effector assembly, a configuration tool, and a controller. The robot, end-effector assembly, and configuration tool together address some of the aforementioned problems associated with existing end-effector designs. The end-effector assembly disclosed herein can be quickly reconfigured by the robot in response to control signals issued by the controller, and thereafter used for material handling or other purposes when processing different components, for instance contoured body panels or flat panes of glass. In lieu of conventional self-locking clutches or calipers, each tool branch and its tool module is automatically unclamped, moved, and re-clamped with screw clamp mechanisms configured as a set of linear/rotary joint locks, which are selectively adjustable via a configuration tool coupled to a robotic arm. The present design may provide certain cost and weight advantages relative to existing systems.

In an embodiment, the robotic system includes at least one robotic arm and an end-effector assembly movably coupled to the robotic arm. The end-effector assembly includes a main boom, a frame rail coupled to the main boom, and a plurality of tool branches movably coupled to the frame rail. At least one of the tool branches includes a branch rail movably coupled to the frame rail and a first lock (e.g., a branch lock) coupling the branch rail to the frame rail. The lock is movable relative to the frame rail between an unlocked position and a locked position in order to fix the position of the branch rail relative to the frame rail. The tool branch further includes a protrusion, such as a lug, coupled to the first lock. The robotic system also includes a configuration tool movably coupled to the robotic arm. The configuration tool includes a tool body and a gripper coupled to the tool body. The gripper includes a plurality of gripper fingers movable away from and toward each other. During operation, the gripper fingers can grasp the protrusion (e.g., lug) coupled to the first lock. The configuration tool is coupled to the end-effector assembly when the gripper fingers grasp the protrusion. Further, the configuration tool includes a driver bit extending from the tool body. The driver bit is aligned with the first lock when the gripper fingers grasp the protrusion such that rotating the driver bit causes the lock to move between the locked and unlocked positions. The tool branch may also include a swing arm movably coupled to the branch rail and second lock (e.g., swing lock) coupling the branch rail to the swing arm. The first and second locks allow each tool branch to have five degrees of freedom of configurability.

The above and other features and advantages of the present disclosure are apparent from the following detailed description of some of the best modes, if known, and other embodiments for carrying out the disclosure, as defined in the appended claims when taken in connection with the accompanying drawings.

DETAILED DESCRIPTION

Figure 1:
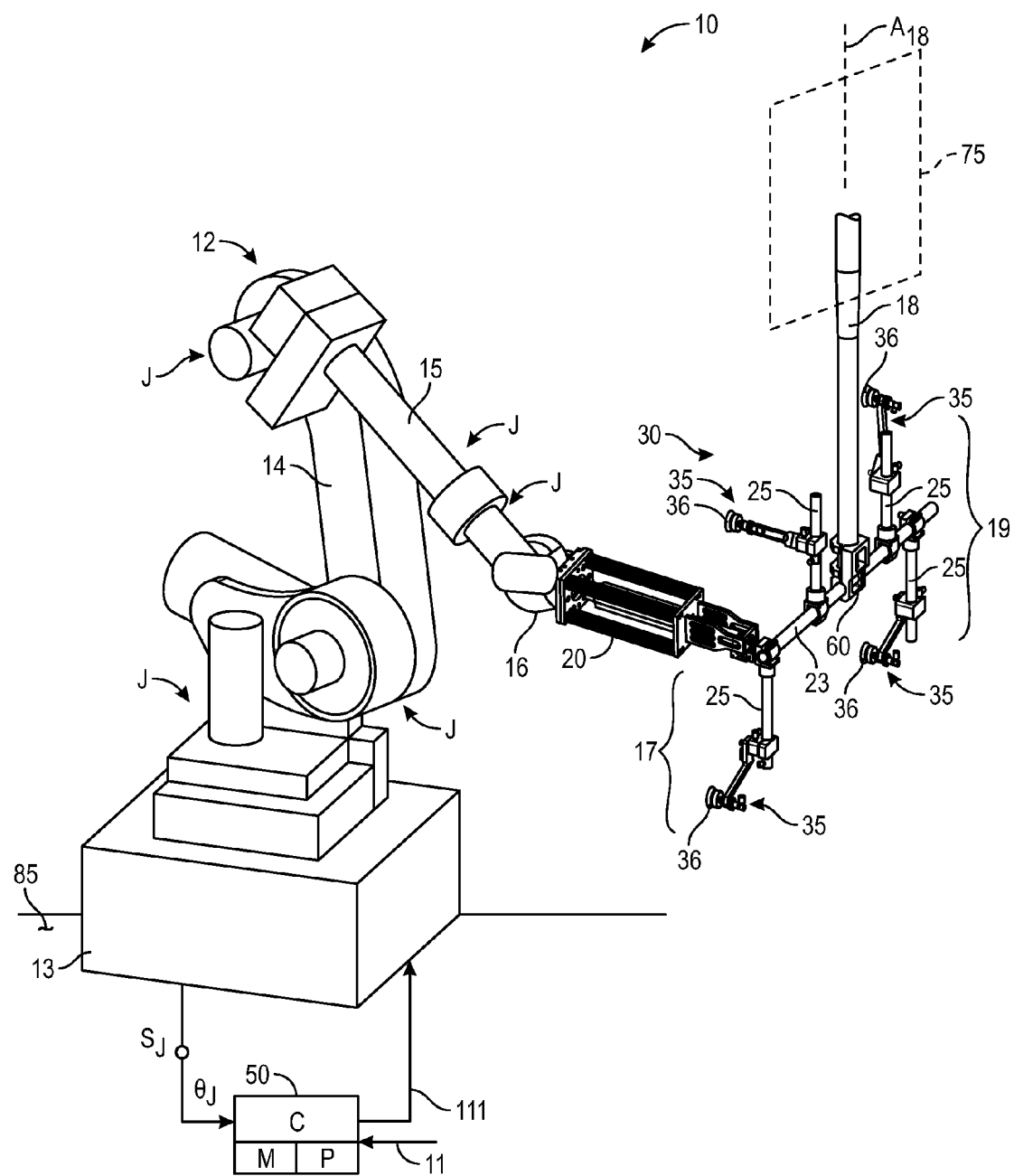
FIG. 1 is a schematic perspective view of a robotic system including an end-effector assembly.

Referring to the drawings, wherein like reference numbers refer to like components throughout the several Figures, a robotic system 10 is shown schematically in FIG. 1. The robotic system 10 includes a multi-axis industrial robot 12, a configuration tool 20, and a reconfigurable end-effector assembly 30 described in detail below. Overall operational control of the robotic system 10 may be achieved via a controller (C) 50. The robotic system 10 also includes a configuration stand 75 as discussed below.

The controller 50 may be configured as a host machine, e.g., a digital computer, which is specially programmed to execute steps or instructions. To that end, the controller 50 includes sufficient hardware to perform the required method steps, i.e., with sufficient memory (M), a processor (P), and other associated hardware such as a high-speed clock, analog-to-digital and/or digital-to-analog circuitry, a timer, input/output circuitry and associated devices, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like. The controller 50 receives and records the measured joint positions (arrow $\theta_J$) from the position sensors ($S_J$), and also monitors forces applied by or to the end-effector assembly 30 in the course of configuring the end-effector assembly 30 as well as while operating on a given work piece. The controller 50 generates or receives input signals (arrow 11) informing the controller 50 as to the required work tasks to perform and identifying the corresponding work pieces, and outputs control signals (arrow 111) to the robot 12 to command the required actions from the robot 12.

The robot 12 may be configured as a 6-axis industrial robot and may include a fixed or mobile base 13 and a plurality of robotic joints J, at least some of which are shown in FIG. 1. The various joints J connect segments or serial linkages of the robot 12, including a first or lower robotic arm 14, a second or upper robotic arm 15, and a wrist 16, which collectively provide the desired range of motion and number of control degrees of freedom needed for performing assigned work tasks. It is contemplated that the robot 12 may include more or fewer robotic arms and wrists.

Examples of such work tasks include the grasping, lifting, locating, and placement of panels of metal or glass panes, along with a host of other possible tasks such as painting and welding. Joint position sensors $S_J$ may be positioned with respect to each joint J and configured to measure and report the measured joint positions (arrow $\theta_J$) to the controller 50. Additionally, one or more force sensors (not shown) may also be positioned with respect to the joints J, e.g., the wrist 16, and used to provide force or torque feedback to the controller 50, which may avoid excessive force on the work piece or the end-effector assembly 30.

With respect to the end-effector assembly 30 in particular, this structure may include a master boom 18 and a latticed end-effector array 19. The end-effector array 19 in the depicted embodiments includes one frame rail 23 arranged orthogonally with respect to a longitudinal axis $A_{18}$ of the master boom 18. It is contemplated, however, that the end-effector array 19 may include more than one frame rail 23. In the depicted embodiment, the frame rail 23 may have a substantially cylindrical shape or may otherwise have a circumferential cross-section. The end-effector array 19 additionally includes a plurality of tool branches 17 movably coupled to the frame rail 23. However, the end-effector array 19 may alternatively have only a single tool branch 17. Each tool branch 17 includes a branch rail 25 cantilevered from the frame rail 23 and extending radially outward from the frame rail 23. The various branch rails 25 are slidingly attached to/translatable along the frame rail 23. In other words, the branch rails 25 are movably coupled to the frame rail 23. Individual tool modules 35 are suspended from the branch rails 25. The frame rail 23 is connected in turn to the master boom 18 via a mechanical coupling 60.

The master boom 18 includes a double-sided tool changer assembly 21 (FIG. 2) having separate first and second tool changers 21A and 21B. The term "tool changer" refers to manual or automatic assemblies that enable rapid change out of robotic end-effectors. Such devices typically include integrated power and communications ports, connectors, and the like as needed for functioning of the end tools 36, such as vacuum suction cups or grippers. In the depicted embodiment, the tool changer assembly 21 is specially configured to provide simultaneous engagement of the master boom 18 with both the robot 12 and the configuration stand 75, the latter of which is shown schematically in FIG. 1.

Figure 2:
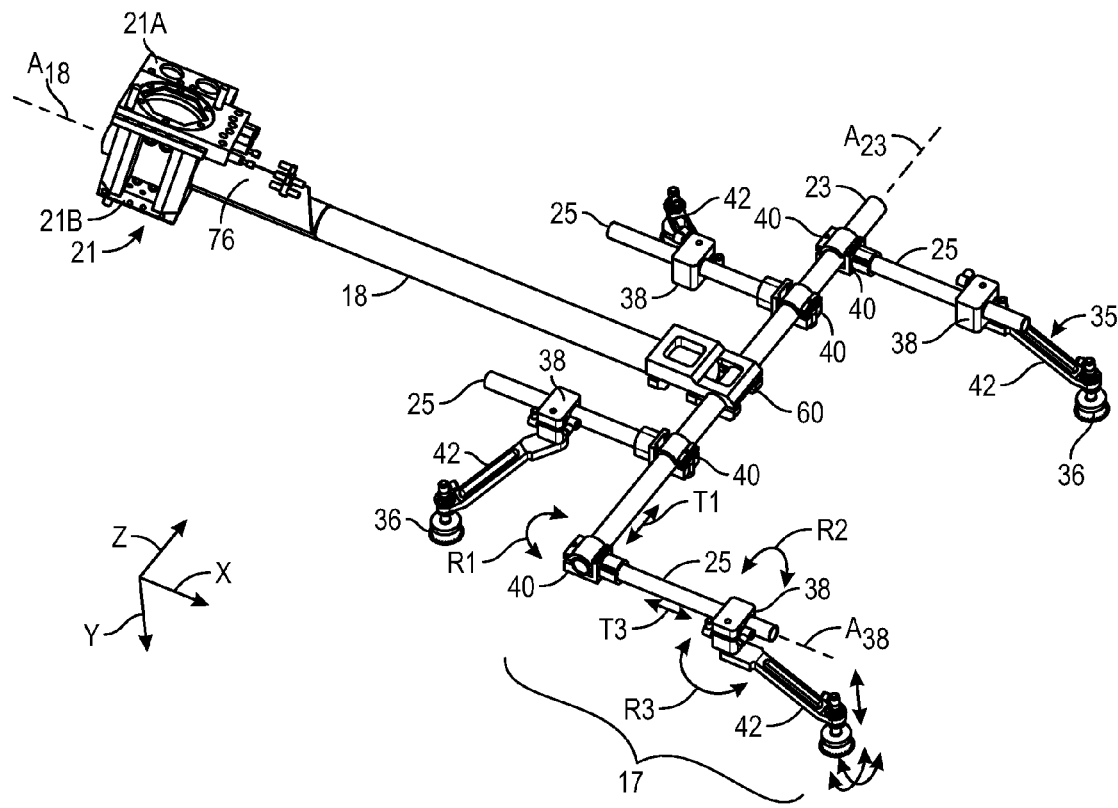
FIG. 2 is a schematic perspective view of the end-effector assembly shown in FIG. 1, wherein the end-effector assembly includes a frame rail and a plurality of tool branches.

For the purposes of the present disclosure, the configuration stand 75 of FIG. 1 may be fixed with respect to a floor 85 or suspended from a vertical surface such as a machine column or wall. The configuration stand 75 has a predetermined position in a Cartesian (e.g., XYZ) frame of reference as shown in FIG. 2, and thus provides a calibrated reference point for zeroing of the robot 12 during reconfiguration of the end-effector assembly 30. For example, when transitioning from a first configuration to another configuration, the robot 12 connects the first tool changer 21B to the configuration stand 75 and releases the second tool changer 21A. As the robot 12 reconfigures the end-effector assembly 30, the locations in free space of each of the joint locking mechanisms described below is known to the controller 50 by virtue of the known location in the frame of reference provided by the configuration stand 75. In the event the configuration of the end-effector 30 becomes unknown during an operation, e.g., due to an impact event or power failure, the end-effector assembly 30, while suspended from the configuration stand 75, can be manually set to a calibrated setting in which the positions of the various end tools 36 are known, with configuration thereafter commencing from the zeroed setting.

Figure 3:
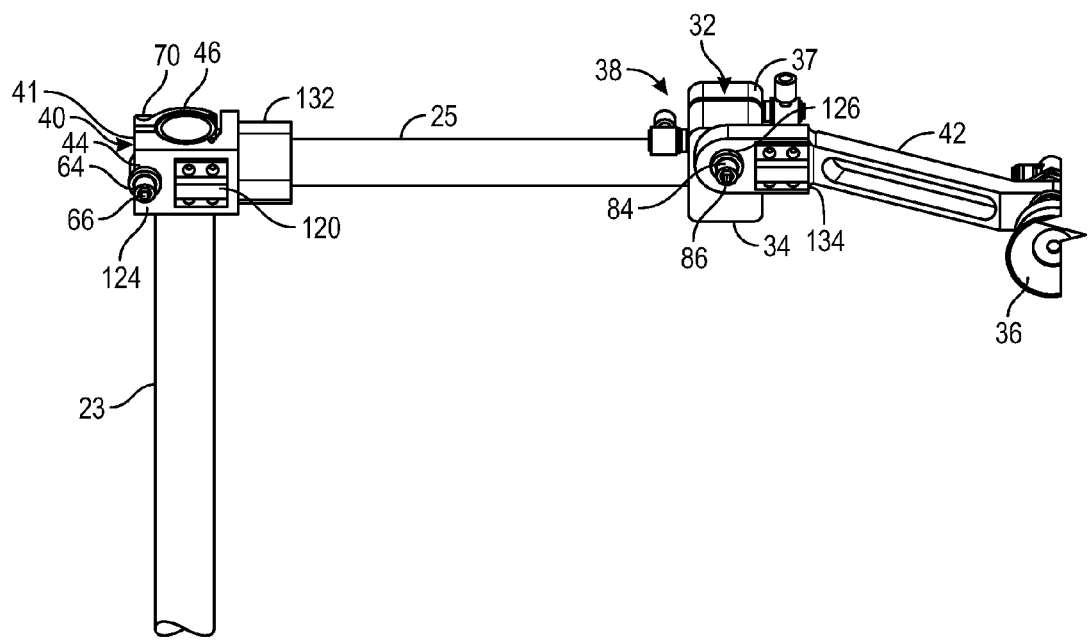
FIG. 3 is a schematic perspective, fragmentary view of the frame rail and one of the tool branches shown in FIG. 2

As described below with particular reference to FIGS. 2 and 3, the branch rails 25 with attached tool modules 35 are automatically repositionable by the robot 12 using the configuration tool 20 (FIG. 1) and instructions executed by the controller 50. Accordingly, the tool branches 17 may be arranged as desired to permit the tool modules 35, or more precisely the individual end tools 36 of the tool modules 35, to attach to or otherwise interact with a given work piece. In a non-limiting body panel example, the corresponding end tools 36 as shown in the various Figures are configured as pneumatic suction cups or grippers of the type commonly used to secure and move automotive or other body panels without marring cosmetic show surfaces. However, other end tools 36, such as pinchers, clamps, spray nozzles, may be used. Therefore, the particular construction of the end tools 36 may vary. In each tool branch 17, a swing arm 42 is coupled between the end tool 36 and the branch rail 25.

The swing arm 42 is obliquely angled relative to the branch rail 25 in order to help the end tool 36 interact with a work piece.

The end-effector assembly 30 can be reconfigured to interact with work pieces having different sizes, shapes, and/or surface contours relative to each other and other work pieces (not shown), and constructed from different materials. For example, a work piece may be considerably larger and more uniform than another work piece, thereby requiring different configurations of the same tool modules 35. Any number of possible work pieces may be encountered in a given manufacturing operation, and thus the end-effector assembly 30 is reconfigurable by the robot 12 of FIG. 1 to operate on any of them individually as needed.

The controller 50 of FIG. 1 is made aware of the particular work piece to be operated on via the input signals (arrow 11 of FIG. 1), such as via manual selection by an operator, detection of an RFID tag, or any other suitable identifying process. The controller 50 then automatically selects a corresponding configuration from its memory (M). After the end-effector assembly 30 has been hung on the configuration stand 75 and rotated to a configuration position, the robot 12 attaches the configuration tool 20 of FIG. 5 at a suitable work station (not shown) to its wrist 16 or other suitable end linkage and configures the end-effector assembly 30. Such a work station may be embodied as a fixture that allows the configuration tool 20 to be retained at a calibrated position, i.e., a position readily accessible by the wrist 16. All of this occurs while the end-effector assembly 30 remains captive on the configuration stand 75.

Once the end-effector 30 has been fully configured for the task at hand using the configuration tool 20, the robot 12 automatically deposits the configuration tool 20 to its workstation, detaches the configuration tool 20 from the wrist 16, picks up the now-configured end-effector assembly 30 by engaging the tool changer assembly 21, removes the end-effector assembly 30 from the configuration stand 75, and commences operations on a work piece. The ability of the robot 12 to reconfigure the end-effector assembly 30 allows for its use across a wide range of possible work pieces.

Referring to FIG. 2, the end-effector assembly 30 includes at least one frame rail 23 arranged orthogonally with respect to the boom axis $A_{18}$ of the main boom 18, with the various tool modules 35 connected with respect to the radially-extending branch rails 25. In an example embodiment in which the end tools 36 are pneumatic grippers, pneumatic tubing 76 may be routed along the main boom 18 and directed to the various end tools 36.

With reference to FIGS. 2-8, each tool branch 17 includes a first or branch lock 40 coupling the branch rail 25 to the frame rail 23. In the depicted embodiment, the first lock 40 can move between the locked and unlocked positions. In the locked position, the first lock 40 fixes the position of the branch rail 25 relative to the frame rail 23 and, therefore, the branch rail 25 remains stationary relative to the frame rail 23. When the first lock 40 is in the unlocked position, the branch rail 25 can translate along the frame rail 23 in the directions indicated by double arrows T1 and can rotate about the frame rail 23 in the directions indicated by double arrows R1. In this manner, any number of different configurations of the tool modules 35 may be set by the robot 12 as needed in response to the commands (arrow 111) from the controller 50. Due to its circumferential cross-section (e.g., circular cross-section), the frame rail 23 allows the first lock 40 to rotate about the frame rail axis $A_{23}$ when the first lock 40 is in the unlocked position. In addition, the first lock 40 can slide along the frame rail axis $A_{23}$ when it is disposed in the unlocked position. As discussed in detail below, the configuration tool 20 can be used to move the first lock 40 between the locked and unlocked positions.

In the depicted embodiment, the first lock 40 includes a clamp (which is referred herein as the first clamp 41) for clamping the frame rail 23. The first clamp 41 is configured as a wrap-around clamp and includes a first clamp base 44 and first clamp arm 46 movably coupled to the first clamp base 44. The first clamp base 44 defines a clamp recess 48 (FIG. 8) configured, shaped, and sized to receive a portion of the frame rail 23. The clamp recess 48 may have a concave shape in order to allow the frame 23 to seat on the first clamp base 44.

The first clamp 41 further includes a hinged portion 43 coupled between the clamp arm 46 and the first clamp base 44. A first hinge 45 pivotally couples the hinged portion 43 to the first clamp arm 46, and a second hinge 47 pivotally couples the hinged portion 43 to the first clamp base 44. The hinged portion 43 helps to tighten the first clamp 41 around the frame rail 23.

A fastener (which is referred herein as the first fastener 51) can movably couple the first clamp base 44 to the first clamp arm 46. As non-limiting examples, the first fastener 51 may be a screw, a bolt, or any other suitable fastener including external threads. In the depicted embodiment, for example, the first fastener 51 includes a shaft (i.e., the first shaft 62) and a head (i.e., the first head 64) coupled to the first shaft 62. The first head 64 is outside the first clamp base 44 and includes a first socket 66 (FIG. 3). The first shaft 62 is partially disposed in a first hole 68 extending through the first clamp base 44. The first fastener 51 (as well as the first hole 68) extend along a first fastener axis A51. The first shaft 62 also extends through the clamp arm 46 and into a cap 70, such as a nut. The cap 70 has an internally threaded hole 72 configured, shaped, and sized to mate with an externally threaded portion 74 of the first shaft 62. The cap 70 is fixed to the first clamp arm 46. As a result, rotating the first fastener 51 causes the cap 70 (and the first clamp arm 46) to move in the direction indicated by double arrow T2, thereby tightening or loosening the first clamp 41 with respect to the frame rail 23. Specifically, rotating the first fastener 51 in a first rotational direction (e.g., clockwise) locks the first clamp 41, and rotating the first fastener 51 in an opposite direction (e.g., counterclockwise) unlocks the first clamp 41. When the first clamp 41 is locked, the branch rail 25 is fixed with respect to the frame rail 23 and therefore remains stationary relative to the frame rail 23. When the first clamp 41 is unlocked, the branch rail 25 can translate and rotate relative to the frame rail 23. The first clamp 41 may be configured as an integral clamp body with a flexible slit, a two-part clamp with one hinge, a double-hinged three-part clamp, or any other suitable clamp design. The first lock 40 additionally includes a permanent clamp 132 that holds the branch rail 25 orthogonal relative to the frame rail 23.

With continued reference to FIGS. 2-8, each tool branch 17 includes a second or swing lock 38 coupling the branch rail 25 to the swing arm 42. In the depicted embodiment, the second lock 38 can move between the locked and unlocked positions. In the locked position, the second lock 38 fixes the position of the swing arm 42 relative to the branch rail 25 and, therefore, the swing arm 42 remains stationary relative to the branch rail 25. When the second lock 38 is in the unlocked position, the swing arm 42 can translate along the branch rail 25 in the directions indicated by double arrows T3 and can rotate about the branch rail 25 in the directions indicated by double arrows R2 and R3. In this manner, any number of different configurations of the tool modules 35 may be set by the robot 12 as needed in response to the commands (arrow 111) from the controller 50. Due to its circumferential cross-section (e.g., circular cross-section), the branch rail 25 allows the second lock 38 to rotate about the branch rail axis $A_{38}$ when the second lock 38 is in the unlocked position. In addition, the second lock 38 can slide along the branch rail axis $A_{38}$ when it is disposed in the unlocked position. As discussed in detail below, the configuration tool 20 can be used to move the second lock 38 between the locked and unlocked positions.

In the depicted embodiment, the second lock 38 includes a clamp (which is referred herein as the second clamp 32) for clamping the branch rail 25. The second clamp 32 is configured as a wrap-around clamp and includes a second clamp base 34 and second clamp arm 37 movably coupled to the second clamp base 34. The second clamp base 34 defines a second clamp recess 137 (FIG. 9) configured, shaped, and sized to receive a portion of the branch rail 25. The second clamp recess 137 may have a concave shape in order to allow the branch rail 25 to seat on the second clamp base 34.

The second clamp 32 further includes a frusto-conical wedge 73 protruding from the second clamp base 34 toward the swing arm 42. The swing arm 42 defines a frusto-conical recess 77 configured, shaped, and sized to receive the frusto-conical wedge 73.

Figure 11:
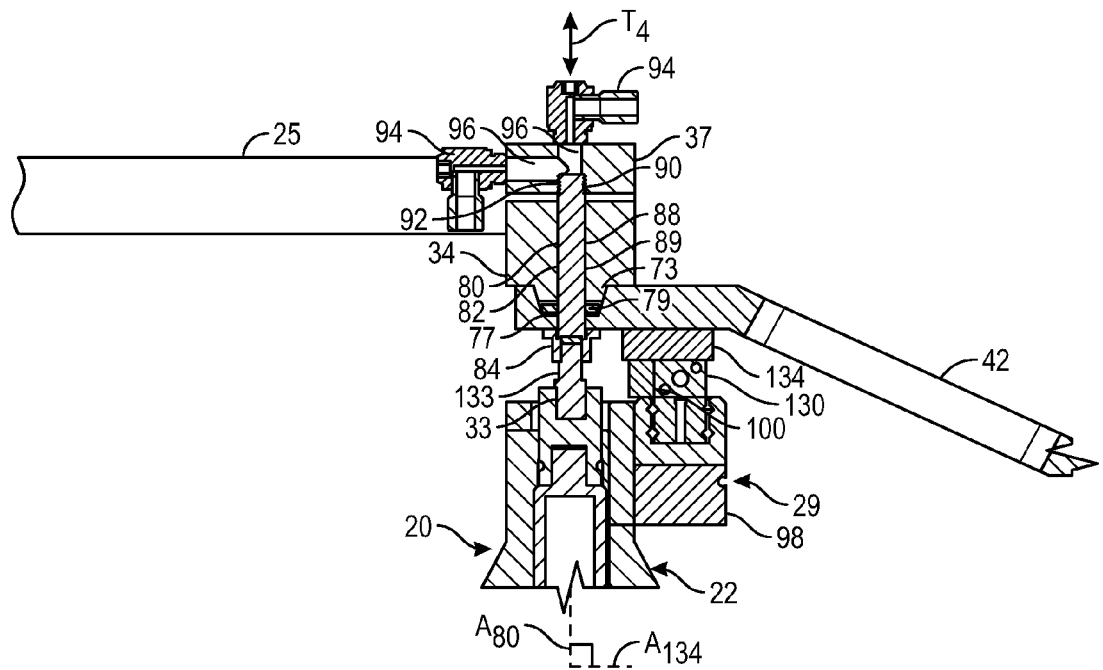
FIG. 11 is a schematic cross-sectional view of the end-effector assembly, taken along section line 11-11 of FIG. 10.

A fastener (which is referred herein as the second fastener 80) can movably couple the second clamp base 34 to the second clamp arm 37. As non-limiting examples, the second fastener 80 may be a screw, a bolt, or any other suitable fastener including external threads. In the depicted embodiment, for example, the second fastener 80 includes a second shaft 82 and a second head 84 coupled to the second shaft 82. The second head 84 is outside the second clamp base 34 and includes a second socket 86 (FIG. 3). The second shaft 82 is partially disposed in a second hole 88 extending through the second clamp base 34. The second fastener 80 (as well as the second hole 88) extends along a first fastener axis $A_{80}$ (FIG. 11). The second shaft 82 also extends through the second clamp arm 37. The second clamp arm 37 has an internally threaded hole 90 configured, shaped, and sized to mate with an externally threaded portion 92 of the second shaft 82. As a result, rotating the second fastener 80 causes the second clamp arm 37 to move in the direction indicated by double arrow T4, thereby tightening or loosening the second clamp 32 with respect to the branch rail 25 and the swing arm 42 as well. Specifically, rotating the second fastener 80 in a first rotational direction (e.g., clockwise) locks the second clamp 32, and rotating the second fastener 80 in an opposite direction (e.g., counterclockwise) unlocks the second clamp 32. The swing arm 42 can rotate about the second fastener axis $A_{80}$ in the direction indicated by double arrows R3 (FIG. 11) and translate and rotate about the branch rail axis $A_{38}$ in the direction indicated by double arrows T3 and R2 respectively (FIG. 2) when the second lock 38 is in the unlocked position. The second clamp 32 may alternatively be configured as an integral clamp body with a flexible slit, a two-part clamp with one hinge, a double-hinged three-part clamp, or any other suitable clamp design.

Two pneumatic fittings 94 may be coupled to the second clamp 32 in order to fluidly couple pneumatic tubing 76 (FIG. 2) to the end tools 36. The pneumatic fittings 94 are in fluid communication with fluid passages 96 formed through the second clamp arm 37 (or another part of the second clamp 32). The elbow-shaped pneumatic fittings 94 can be swiveled on the mounting faces of the second clamp arm 37 to follow the rotation of the second lock 38 and/or the swing arm 42.

Figure 8:
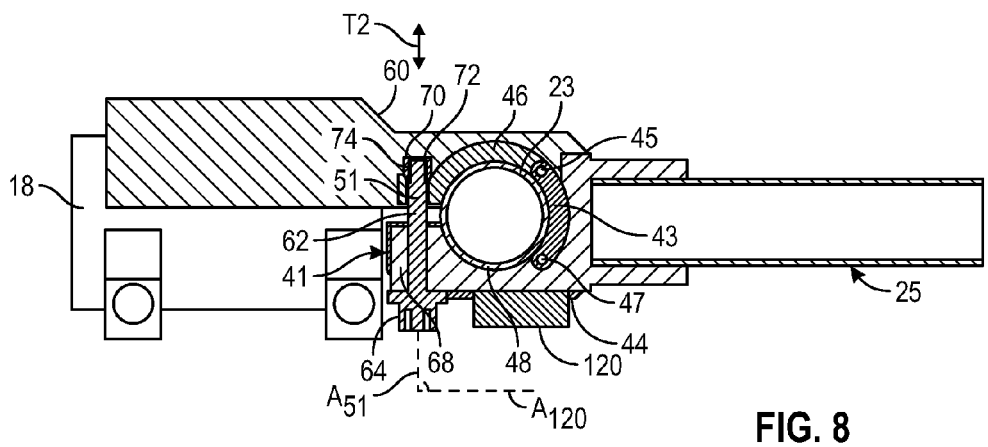
FIG. 8 is a schematic cross-sectional view of the end-effector assembly, taken along section line 8-8 of FIG. 7.

Each tool branch 17 includes a first protrusion 120 coupled to the first lock 40. Specifically, the first protrusion 120 is coupled to a bottom lock surface 124 of the first clamp base 44 and extends in a direction away from the first clamp arm 46. In the depicted embodiment, the first protrusion 120 is configured as a lug and has a polygonal shape in order to facilitate engagement with a gripper as discussed in detail below. Moreover, the first protrusion 120 is elongated along a first protrusion axis $A_{120}$ and is aligned with the first fastener 51. In particular, the first fastener axis $A_{51}$ intersects the first protrusion axis $A_{120}$ at right angle in order to help the configuration tool 20 reconfigure and lock the tool branches 17 (as shown in FIG. 8).

Each tool branch 17 includes a second protrusion 134 coupled to the swing arm 42. Specifically, the second protrusion 134 is coupled to a bottom arm surface 126 of the swing arm 42 and extends in a direction away from the second clamp arm 37. In the depicted embodiment, the second protrusion 134 is configured as a lug and has a polygonal shape in order to facilitate engagement with a gripper as discussed in detail below. Moreover, the second protrusion 134 is elongated along a second protrusion axis $A_{134}$ and is aligned with the second fastener 80. In particular, the second fastener axis $A_{80}$ intersects the second protrusion axis $A_{134}$ at right angle in order to help the configuration tool 20 reconfigure and lock the tool branches 17 (as shown in FIG. 11).

Figure 10:
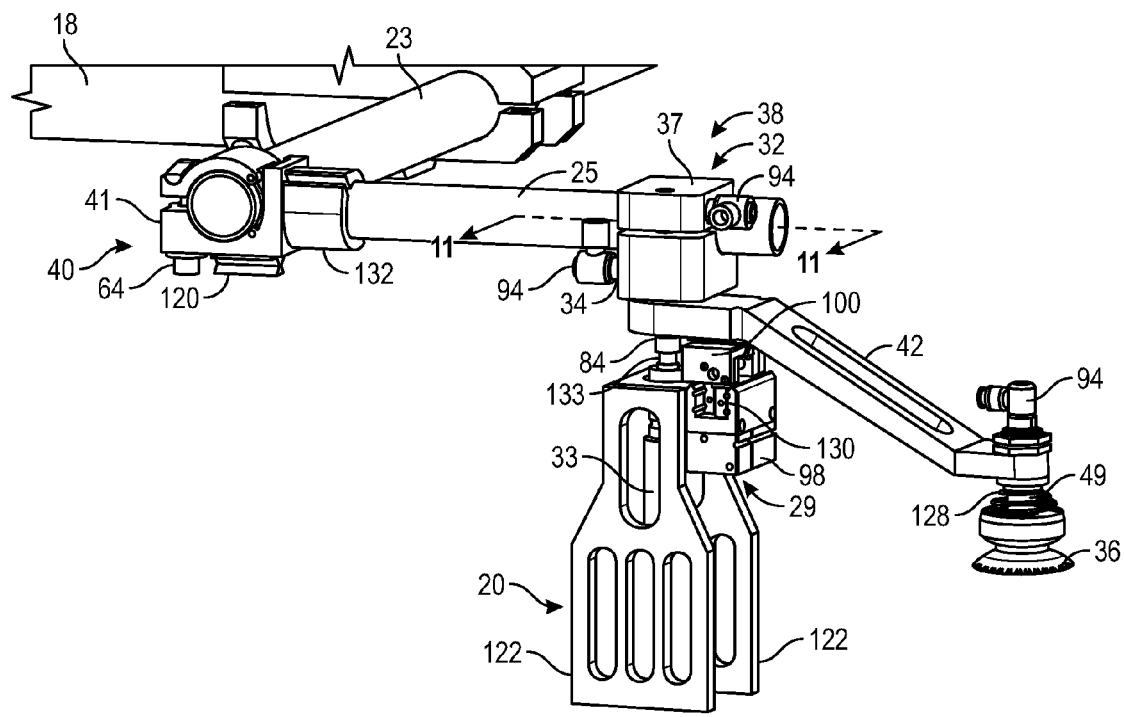
FIG. 10 is a schematic perspective view of the configuration tool coupled to the swing lock of the end-effector assembly.

As shown in FIGS. 10 and 11, the end tool 36 is coupled (e.g., bolted) to an end of the swing arm 42 and also may be suspended via a spring 128 and swivel assembly 49 as shown to enable optimal conforming to the different heights and contours of the work pieces. A pneumatic fitting 94 may be couple to the end tool 36 in order to deliver fluid to that end tool 36.

Figure 4:
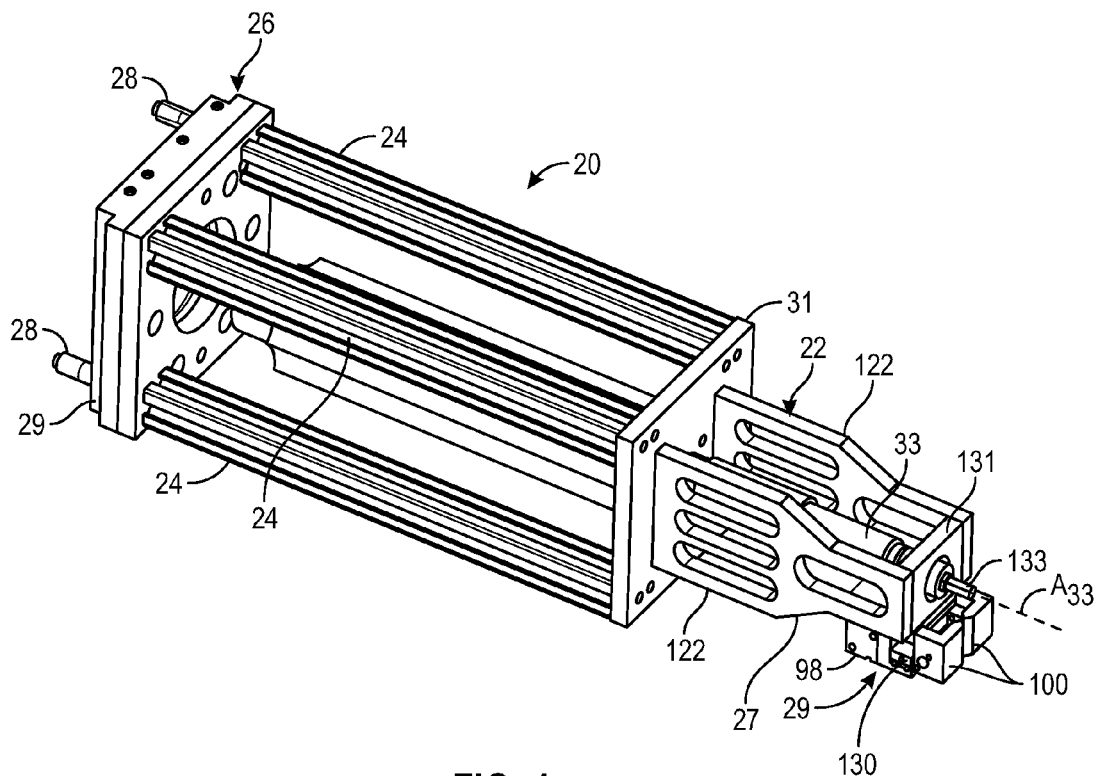
FIG. 4 is a schematic perspective view of a configuration tool usable as part of the robotic system shown in FIG. 1, wherein the configuration tool includes a gripper fingers depicted in a closed position.
Figure 5:
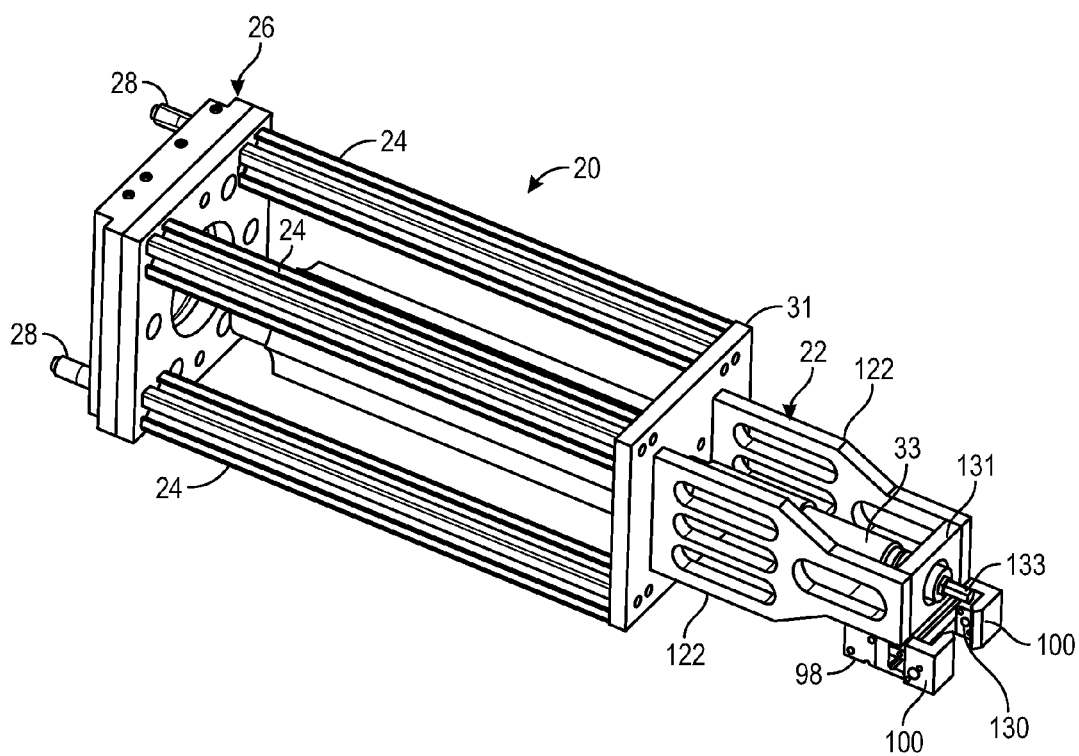
FIG. 5 is a schematic perspective view of a configuration tool usable as part of the robotic system shown in FIG. 1, showing the gripper fingers in an open position.

With specific reference to FIGS. 4 and 5, the configuration tool 20 includes an axially-extending tool assembly 22 and a tool changer 26 coupled to the tool assembly 22 via axially-extending support rails 24. The tool assembly 22 includes a tool body 27, which may include parallel plates 122 each shaped as a rectangle or a polygon. Each parallel plate 122 is mounted to (and extends from) a first end plate 31 toward a second end plate 131. The first and second end plates 31 and 131 are part of the tool body 27 and may be rectangular in shape. The first end plate 31 may be larger in area than the second end plate 131 to facilitate use in configuring the end-effector assembly 30.

A nutrunner 33 can rotate about a nutrunner axis $A_{33}$ and extends through the second end plate 131 and is used to adjust the first lock 40 and the second lock 38. In the present disclosure, the term "nutrunner" means a powered torque wrench capable of using pneumatic, electric, or hydraulic power to rotate and transmit torque. The nutrunner 33 may be driven with a servo motor and control for precise and consistent rotation. The nutrunner axis $A_{33}$ may also be referred to as a bit axis.

In addition, the tool assembly 22 includes a gripper 29 coupled to the tool body 27 at a location closer to the second end plate 131 than to the first end plate 31. The gripper 29 is parallel to the nutrunner 33 and includes a gripper actuator 98 and a plurality of gripper fingers 100 movably coupled to the gripper actuator 98. The gripper 98 can be an electric or pneumatic actuator, and the tool changer 26 can channel electricity or pneumatic fluid for controlling the gripper 29 when the configuration tool 20 is mounted to the wrist 16.

In the depicted embodiment, the gripper 29 includes two fingers 100. However, the gripper 29 may include more than two fingers 100. Irrespective of the quantity, the gripper fingers 100 can move relative to one another between a first or open position (FIG. 5) and a second or close position (FIG. 4). When disposed in the second position (FIG. 4), the gripper fingers 100 are closer to each other than in the first position (FIG. 5). Each of the gripper fingers 100 may have an L-shape and may be coupled to the gripper actuator 98 via sliding members 130. The sliding members 130 are coupled to the gripper fingers 100 and can slide with the gripper actuator 98 in order to move the gripper fingers 100 between the first and second positions.

The gripper fingers 100 of the gripper 29 are configured to grasp the first protrusion 120 in order to hold the first lock 40, thereby allowing the configuration tool 20 to move (translate or rotate) the branch rail 25 relative to the frame rail 23. Similarly, the gripper fingers 100 of the gripper 29 can grasp the second protrusion 134 in order to hold the swing arm 42, thereby allowing the configuration tool 20 to move (e.g., rotate or translate) the swing arm 42 relative to the branch rail 23.

The tool changer 26 of the configuration tool 20 may be any suitable a mechanical coupling allowing the robot 12 to pick up the configuration tool 20 and includes guide pins 28 or other suitable coupling devices which enable the robot 12 to engage the configuration tool 20 with the wrist 16. The tool changer 26 may also include electrical ports capable of channeling electric power and control signals to run the nutrunner 33 via a drive motor inside the nutrunner 33. Once coupled to the wrist 16, the configuration tool 20 locks into place and electrical and/or pneumatic power is provided to the nutrunner 33 as needed to rotate the driver bit 133, e.g., a hex-head bit. Thus, actuating the nutrunner 33 causes the driver bit 133 to turn. At least part of the nutrunner 33 extends through the second end plate 131 in a direction away from the first end plate 31, such that the driver bit 133 is outside the tool body 27 and extends and beyond the second end plate 131.

Figure 6:
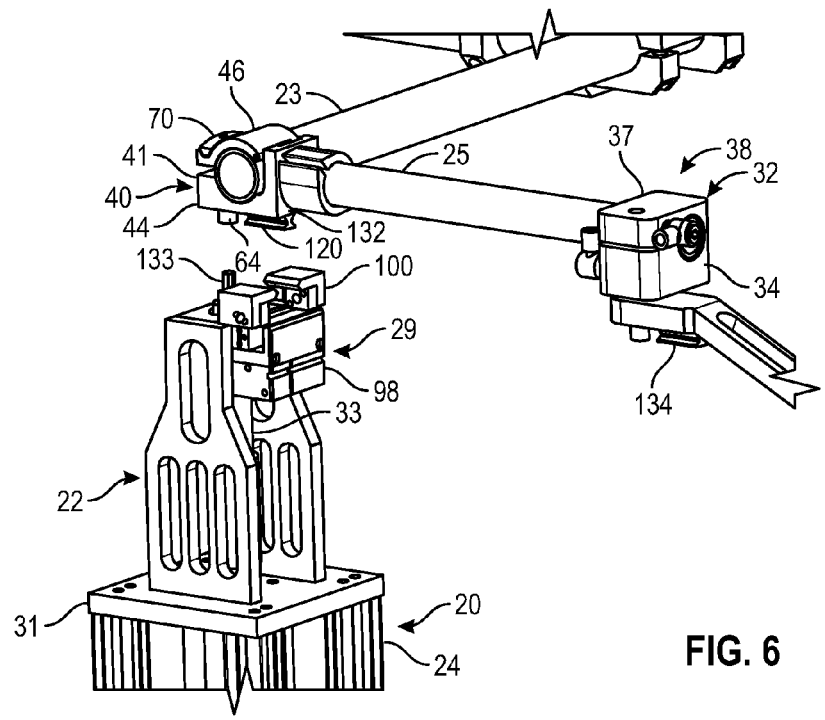
FIG. 6 is a schematic perspective view of the configuration tool moving toward the first lock of the end-effector assembly.
Figure 7:
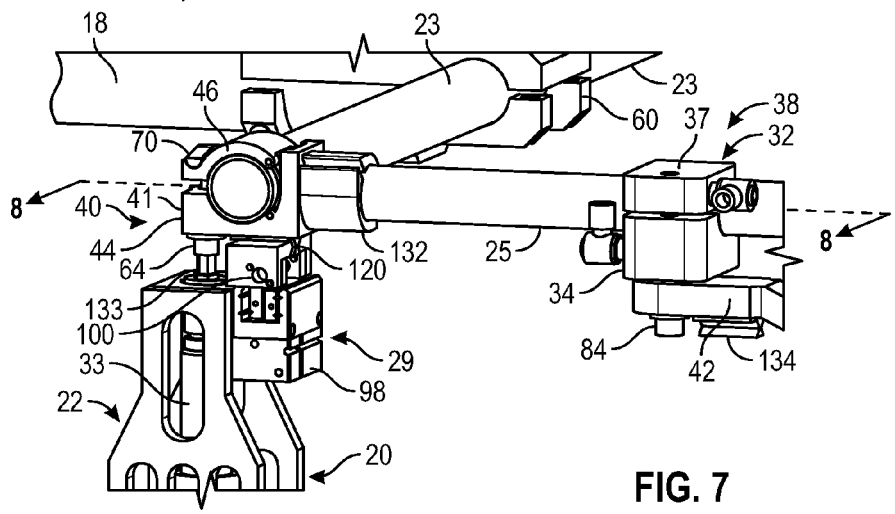
FIG. 7 is a schematic perspective view of the configuration tool coupled to the first lock of the end-effector assembly.

Referring to FIGS. 6 and 7, in order to reconfigure the tool branch 17, the robot 12 manipulates the configuration tool 20 first to engage the nutrunner 33 and its driver bit 133 with the first fastener 51 of the first clamp 41 that wraps around on the frame rail 23, while the gripper fingers 100 on the configuration tool 20 remain fully open (i.e., in the first position) but in a position that is ready to engage with the first protrusion 120. Specifically, the robot 12 moves the configuration tool 20 toward the first fastener 51 such that the driver bit 133 is aligned with the first fastener 51 and the gripper fingers 100 of the gripper 29 are aligned with the first protrusion 120 while the gripper fingers 100 are in the first position (i.e., open position). The configuration tool 20 should be moved toward the first clamp 41 until the driver bit 133 is engaged with the first head 64 of the first fastener 51 and the gripper fingers 100 surround the first protrusion 120. Then, as shown in FIG. 7, the gripper fingers 100 are then closed (i.e., moved to the second position) in order to grasp the first protrusion 120. As discussed above, the gripper fingers 100 can be actuated pneumatically or electrically. Next, the controller 50 electrically commands the nutrunner 33 to rotate (e.g., counter-clockwise) to unlock first clamp 41. With the gripper fingers 100 of the configuration tool 20 grasping tightly on the first protrusion 120, the robot 12 can slide the branch rail 25 along the frame rail 23 as well as rotate the branch rail 25 around the frame rail 23 to the desired position or orientation. Afterwards, the nutrunner 33 on the configuration tool 20 is commanded (by the controller 50) to rotate (e.g., clockwise) to tighten the first clamp 41. The controller 50 can also command the gripper fingers 100 to open (i.e., move to the first position) in order to release the first protrusion 120. Lastly, the robot 12 disengages the configuration tool 20 from the first lock 40 to complete the reconfiguration operation.

Figure 9:
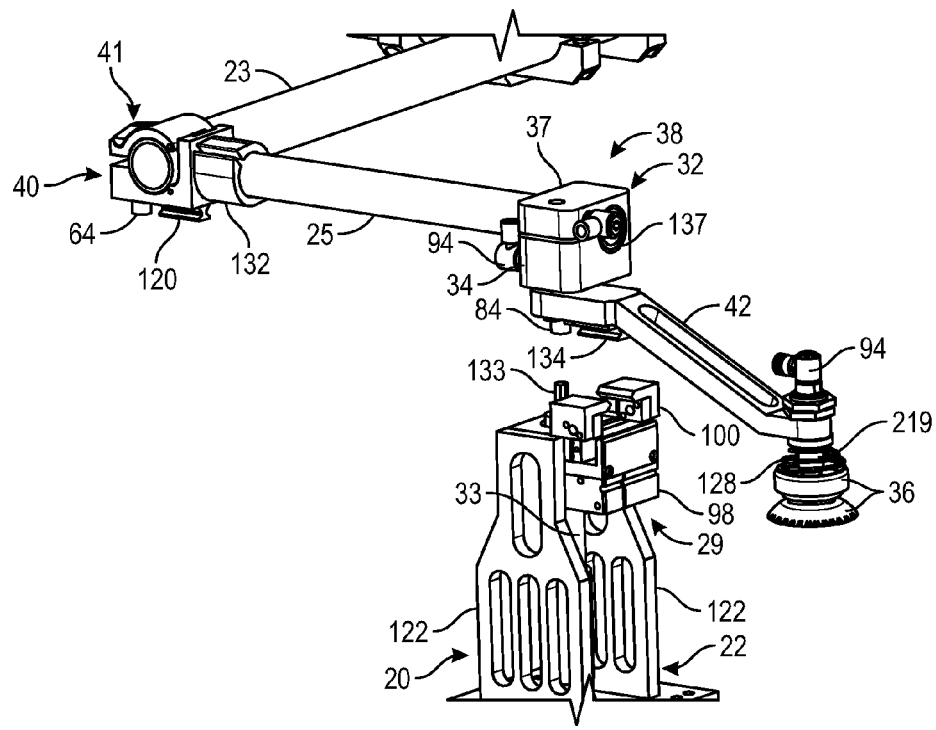
FIG. 9 is a schematic perspective view of the configuration tool moving toward the swing lock of the end-effector assembly.

Referring to FIGS. 9 and 10, in order to configure the swing arm 42 or adjust the position and/or orientation of the end tool 36 (e.g., vacuum gripper), the robot 12 manipulates the configuration tool 20 first to engage the nutrunner 33 and its driver bit 133 with the second fastener 80 of the second clamp 32, while the gripper fingers 100 on the configuration tool 20 remains fully open (i.e., in the first position) but in a position that is ready to engage with the second protrusion 134. Specifically, the robot 12 moves the configuration tool 20 toward the second fastener 80 such that the driver bit 133 is aligned with the second fastener 80 and the gripper fingers 100 of the gripper 29 are aligned with the second protrusion 134 while the gripper fingers 100 are in the first position (i.e., open position). The configuration tool 20 should be moved toward the second clamp 32 until the driver bit 133 is engaged with the second head 84 of the second fastener 80 and the gripper fingers 100 surround the second protrusion 134. The gripper fingers 100 are then closed (i.e., moved to the second position) to grasp on the second protrusion 134. As discussed above, the gripper fingers 100 can be actuated pneumatically or electrically. Next, the controller 50 electrically commands the nutrunner 33 to rotate (e.g., counter-clockwise) to unlock second clamp 32 as well as the locking between the frusto-conical wedge 73 and frusto-conical recess 77 with the help of the wedge breaker 79 that provides the separating push as the second fastener 80 threads out from the thread hole 90 of the second clamp arm 37. With the gripper fingers 100 of the configuration tool 20 grasping tightly on the second protrusion 134, the robot 12 can slide the second lock 38 along the branch rail 25 and rotate the second lock 38 around the branch rail 25 to the desired position and orientation, respectively. Meanwhile, the robot 12 can also rotate the swing arm 42 and the end tool 36 (e.g., vacuum gripper) around the second fastener axis $A_{80}$ of the second fastener 80. Afterwards, the nutrunner 33 on the configuration tool 20 is commanded (via the controller 50) to rotate (e.g., clockwise) to tighten the second clamp 32 as well as the frusto-conical wedge 73 and the frusto-conical recess 77 disposed between the swing arm 42 and the second clamp 32. Then, the gripper fingers 100 are opened (i.e., moved to the first position) to release the second protrusion 134. Lastly, the robot 12 disengages the configuration tool 20 from the second lock 38 to complete the reconfiguration operation. Inside the second lock 38, a pneumatic rotary manifold or coupling can be added for channeling gas (e.g., air) into or out of the end tool 36 (e.g., vacuum gripper) from the first robotic arm 14.

Figure 12:
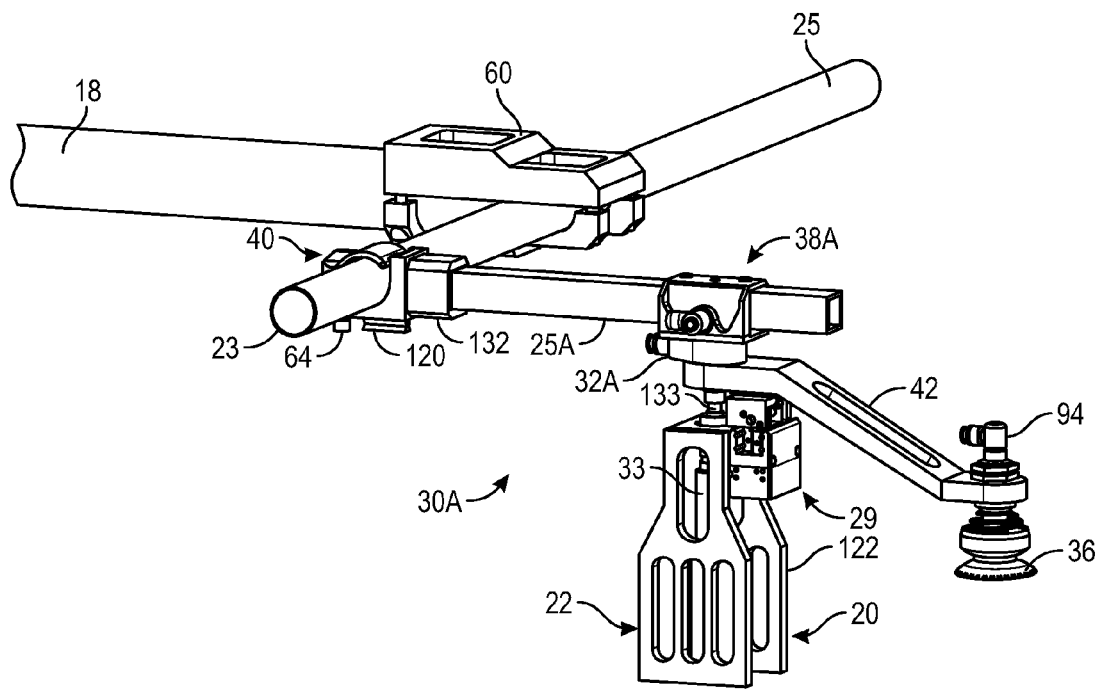
FIG. 12 is a schematic perspective, fragmentary view of an end-effector assembly in accordance with another embodiment of the present disclosure.

FIG. 12 illustrates an end-effector assembly 30A in accordance with another embodiment of the present disclosure. The structure and operation of the end-effector assemblies 30A and 30 (FIG. 1) are substantially similar. Therefore, in the interest of brevity, the differences between these two embodiments are described below. In end-effector assembly 30A, the branch rail 25A has a polygonal cross-sectional shape (e.g., square or rectangular cross-section), and the second lock 38A includes a wedge clamp 32A similar to the frusto-conical wedge 73 and the frusto-conical recess 77. Due to the wedge clamp 32A and the polygonal shape of the branch rail 25A, the second lock 38A cannot rotate about the branch rail 25A. However, the second lock 38 can slide along the branch rail 25A.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A robotic system, comprising:
a robotic arm;
an end-effector assembly movably coupled to the robotic arm, wherein the end-effector assembly includes:
a main boom;
a frame rail coupled to the main boom;
a plurality of tool branches movably coupled to the frame rail, wherein each of the plurality of tool branches includes:
a branch rail movably coupled to the frame rail;
a lock coupling the branch rail to the frame rail, wherein the lock is movable relative to the frame rail between an unlocked position and a locked position so as to fix a position of the branch rail relative to the frame rail;
a protrusion coupled to the lock;
a configuration tool movably coupled to the robotic arm, wherein the configuration tool includes:
a tool body;
a gripper coupled to the tool body, the gripper including a plurality of gripper fingers movable away from and toward each other, wherein the configuration tool is coupled to the end-effector assembly when the gripper fingers grasp the protrusion; and
a driver bit extending from the tool body, wherein the driver bit is aligned with the lock when the gripper fingers grasp the protrusion such that rotating the driver bit causes the lock to move between the locked and unlocked positions.

2. The robotic system of claim 1, wherein the protrusion is elongated along a protrusion axis, the lock includes a fastener elongated along a fastener axis, and the protrusion is aligned with the fastener such that the fastener axis intersects the protrusion axis.

3. The robotic system of claim 2, wherein the protrusion axis intersects the fastener axis at a right angle.

4. The robotic system of claim 1, wherein the branch rail is translatable along the frame rail when the lock is in the unlocked position.

5. The robotic system of claim 4, wherein the branch rail is rotatable about the frame rail when the lock is in the unlocked position.

6. The robotic system of claim 1, wherein the lock is a first lock, and the each of the plurality of tool branches further includes a swing arm movably coupled to the branch rail and a second lock coupling the branch rail to the swing arm, and the second lock is movable relative to the branch rail between an unlocked position and a locked position so as to fix a position of the swing arm relative to the branch rail.

7. The robotic system of claim 6, wherein the protrusion is a first protrusion, and each of the plurality of tool branches includes a second protrusion coupled to the swing arm, and the gripper fingers are configured to grasp the second protrusion in order to couple the configuration tool to the swing arm.

8. The robotic system of claim 7, wherein the swing arm is translatable along the branch rail when the second lock is in the unlocked position.

9. The robotic system of claim 8, wherein the branch rail is elongated along a branch rail axis, and the swing arm is rotatable about the branch rail axis when the second lock is in the unlocked position.

10. The robotic system of claim 9, wherein the first lock is configured as a first clamp, and the second lock is configured as a second clamp.

11. The robotic system of claim 10, wherein first clamp includes a first clamp base and a first clamp arm movably coupled to the first clamp base, and the second clamp includes a second clamp base and a second clamp arm movably coupled to the second clamp base.

12. The robotic system of claim 11, wherein the first clamp includes a first fastener movably coupling the first clamp base to the first clamp arm such that rotating the first fastener causes the first clamp arm to move relative to the first clamp base, and the second clamp includes a second fastener movably coupling the second clamp arm to the second clamp base such that rotating the second fastener causes the second clamp arm to move relative to the second clamp base.

13. The robotic system of claim 12, wherein the driver bit is configured to be rotatably coupled to each of the first and second fasteners.

14. The robotic system of claim 13, wherein the second lock includes a fastener axis, the fastener axis is orthogonal to the branch rail axis, and the swing arm is rotatable about the fastener axis when the second lock is in the unlocked position.

15. The robotic system of claim 1, wherein the configuration tool includes a nutrunner coupled to the driver bit such that actuating the nutrunner causes the driver bit to turn.

16. A configuration tool, comprising:
a tool body;
a gripper coupled to the tool body, wherein the gripper includes:
a gripper actuator coupled to the tool body; and
a plurality of gripper fingers movably coupled to the gripper actuator, wherein the gripper fingers are movable away from and toward each other;
a driver bit extending from the tool body, wherein the driver bit is rotatable about a bit axis; and
a tool changer configured to be coupled to a robotic arm, wherein the tool body includes a first end plate and a second end plate opposite the first end plate, the tool changer is coupled to the first end plate via support rails, and the gripper is closer to the second end plate than to the first end plate.

17. The configuration tool of claim 16, wherein the gripper fingers are movable relative to one another between a first position and a second position, and the gripper fingers are closer to each other in the second position than in the first position.

18. The configuration tool of claim 16, wherein the gripper fingers are disposed outside the tool body.

\* \* \* \* \*